United States Patent
Litvin (10) Patent No.: US 6,772,285 B2
(45) Date of Patent: Aug. 3, 2004

(54) SYSTEM AND METHOD FOR IDENTIFYING BUSY DISK STORAGE UNITS

(75) Inventor: Arkadi L. Litvin, Brookline, MA (US)

(73) Assignee: EMC Corporation, Hopkinton, MA (US)

(*) Notice: Subject to any disclaimer, the term of this patent is extended or adjusted under 35 U.S.C. 154(b) by 769 days.

(21) Appl. No.: 09/726,498

(22) Filed: Nov. 30, 2000

(65) Prior Publication Data

US 2002/0073290 A1 Jun. 13, 2002

(51) Int. Cl.[7] .......................... G06F 3/06; G06F 12/00
(52) U.S. Cl. ................... 711/114; 711/165; 709/105
(58) Field of Search .................. 711/114, 165; 709/105

(56) References Cited

U.S. PATENT DOCUMENTS

| | | | | |
|---|---|---|---|---|
| 5,355,475 A | * | 10/1994 | Tanaka et al. | 707/205 |
| 5,636,355 A | * | 6/1997 | Ramakrishnan et al. | 711/113 |
| 6,671,774 B1 | * | 12/2003 | Lam et al. | 711/112 |
| 2003/0046491 A1 | * | 3/2003 | Katsurashima | 711/114 |

* cited by examiner

Primary Examiner—Kevin Verbrugge
Assistant Examiner—Mehdi Namazi
(74) Attorney, Agent, or Firm—Richard A. Jordan (57) ABSTRACT

A busy disk evaluation system includes a busy disk evaluation module and a control module. The busy disk evaluation module is configured to perform a busy disk evaluation operation in which it processes access request statistics relating to access requests directed to a server, the server including a plurality of disk storage units, respective access requests requesting access to respective ones of the disk storage units, to identify which, if any of the disk storage units is busy. The busy disk evaluation module is configured to determine whether a disk storage unit is busy in relation to a ratio between the number of access requests requesting access to the disk storage unit per unit time exceeds a selected access request per unit time threshold in relation to a total number of access requests and a selected ratio threshold. The control module is configured to control the busy disk evaluation module. In that operation, the control module is configured to provide the busy disk evaluation module with the selected ratio threshold.

36 Claims, 6 Drawing Sheets

105. BUSY DISK EVALUATOR MODULE 31 DETERMINES WHETHER THE RESPECTIVE DISK STORAGE UNIT 20(m) IS A BUSY DISK STORAGE UNIT IN RELATION TO RATIO DETERMINED IN STEP 104 AND TYPE OF APPLICATION AND ASSOCIATED TARGET RATIO VALUE

106. IF BUSY DISK EVALUATOR MODULE 31 DETERMINES THAT NONE OF THE DISK STORAGE UNITS 20(m) ARE BUSY DISKS USING A FIRST SET OF THRESHOLD VALUES AND TARGET RATIO VALUE, AND, IF SO, REPEATS STEP 105 USING LOWER TARGET RATIO VALUE

107. IF THE BUSY DISK EVALUATOR MODULE 31 IDENTIFIES ONE OR MORE DISK STORAGE UNITS 20(m'), 20(m"),... AS BUSY DISK STORAGE UNITS, IT THEREAFTER ENABLES THE OPERATOR INTERFACE 37 TO DISPLAY THE LIST OF DISK STORAGE UNITS 20(m'), 20(m"),...

120. FILE SELECTION MODULE 32 WILL, FOR A BUSY DISK STORAGE UNIT 20(m'), RANK THE FILES STORED THEREON AS TO THE DEGREE TO WHICH THE INDIVIDUAL FILES WERE BUSY

121. FILE SELECTION MODULE 32 SELECTS AS A FILE TO BE RELOCATED FROM THE BUSY DISK STORAGE UNIT 20(m') THE SECOND BUSIEST FILE ON THAT DISK STORAGE UNIT

FIG. 2B

122. AFTER THE FILE SELECTION MODULE 32 HAS IDENTIFIED A FILE THAT CAN BE RELOCATED FROM THE BUSY DISK STORAGE UNIT 20(m'), IT WILL IDENTIFY A FILE ON A NON-BUSY DISK STORAGE UNIT 20(m'") TO BE RELOCATED THEREFROM

130. PERFORMANCE PREDICTION GENERATOR 33 DETERMINES, FOR THE BUSY DISK STORAGE UNIT 20(m'), WHAT THE LENGTH OF THE ACCESS REQUEST QUEUE 23(m') FOR THAT DISK STORAGE UNIT 20(m') WAS AT A RESPECTIVE POINT IN TIME

131. PERFORMANCE PREDICTION GENERATOR 33 DETERMINES, FOR THE BUSY DISK STORAGE UNIT 20(m'), WHAT THE LENGTH OF THE ACCESS REQUEST QUEUE 23(m') FOR THAT DISK STORAGE UNIT 20(m') WAS AT A RESPECTIVE POINT IN TIME, WHAT THE LENGTH OF THE ACCESS REQUEST QUEUE 23(m') FOR THAT DISK STORAGE UNIT 20(m') WOULD BE IF (1) ACCESS REQUESTS IN THE ACCESS REQUEST QUEUE RELATED TO THE FILE TO BE RELOCATED FROM THE BUSY DISK STORAGE UNIT 20(m') WERE REMOVED FROM THE BUSY DISK STORAGE UNIT'S ACCESS REQUEST QUEUE, AND (2) ACCESS REQUESTS IN THE ACCESS REQUEST QUEUE RELATED TO THE FILE TO BE RELOCATED FROM THE NON-BUSY DISK STORAGE UNIT 20(m'") WERE INCLUDED IN THE ACCESS REQUEST QUEUE OF THE BUSY DISK STORAGE UNIT 20(m')

132. PERFORMANCE PREDICTION GENERATOR 33 DETERMINES, FOR THE NON-BUSY DISK STORAGE UNIT 20(m'"), WHAT THE LENGTH OF THE ACCESS REQUEST QUEUE 23(m'") FOR THAT DISK STORAGE UNIT 20(m'") WAS AT THE RESPECTIVE POINT IN TIME

FIG. 2C

133. PERFORMANCE PREDICTION GENERATOR 33 DETERMINES, FOR THE NON-BUSY DISK STORAGE UNIT 20(m'''), WHAT THE LENGTH OF THE ACCESS REQUEST QUEUE 23(m''') FOR THAT DISK STORAGE UNIT 20(m''') WOULD HAVE BEEN THE RESPECTIVE POINT IN TIME IF (1) ACCESS REQUESTS IN THE ACCESS REQUEST QUEUE RELATED TO THE FILE TO BE RELOCATED FROM THE NON-BUSY DISK STORAGE UNIT 20(m') WERE REMOVED FROM THE NON-BUSY DISK STORAGE UNIT'S ACCESS REQUEST QUEUE, AND (2) ACCESS REQUESTS IN THE ACCESS REQUEST QUEUE RELATED TO THE FILE TO BE RELOCATED FROM THE BUSY DISK STORAGE UNIT 20(m') WERE INCLUDED IN THE ACCESS REQUEST QUEUE OF THE NON-BUSY DISK STORAGE UNIT 20(m')

134. PERFORMANCE PREDICTION GENERATOR 33 PERFORM OPERATIONS IN STEPS 130 THROUGH 133 IN CONNECTION WITH THE ACCESS REQUEST STATISTICS AT A NUMBER OF POINTS IN TIME

135. PERFORMANCE PREDICTION GENERATOR 33 DETERMINES THE PERFORMANCE INCREASE IN CONNECTION WITH THE BUSY DISK STORAGE UNIT 20(m') IN RELATION TO, FOR EXAMPLE, THE AVERAGE REDUCTION, IF ANY, OF THE LENGTH OF THE ASSOCIATED ACCESS REQUEST QUEUE 23(m'), AND THE PERFORMANCE DECREASE IN CONNECTION WITH THE NON-BUSY DISK STORAGE UNIT 20(m''') IN RELATION TO, FOR EXAMPLE, THE AVERAGE INCREASE, IF ANY, OF THE LENGTH OF THE ASSOCIATED ACCESS REQUEST QUEUE 23(m''')

FIG. 2D

SYSTEM AND METHOD FOR IDENTIFYING BUSY DISK STORAGE UNITS

FIELD OF THE INVENTION

The invention relates generally to the field of digital data processing systems, and more particularly to systems and methods of determining transfer of files among, for example, disk storage devices comprising a mass storage subsystem or server to speed up access to data stored therein. In addition, the invention relates more particularly to systems and methods for predicting and evaluating the likely increase in performance that might result if files is moved from one disk storage device to another.

BACKGROUND OF THE INVENTION

In enterprise data processing arrangements, such as may be used in a company, government agency or other entity, information is often stored on servers and accessed by users over, for example, a network. The information may comprise any type of information that of programs and/or data to be processed. Users, using their personal computers, workstations, or the like (generally, "computers") will enable their computers to retrieve information to be processed, and, in addition, to.

Generally, servers store data in mass storage subsystems that typically include a number of disk storage units. Data is stored in units, such as files. In a server, a file may be stored on one disk storage unit, or alternatively portions of a file may be stored on several disk storage units. A server may service access requests from a number of users concurrently, and it will be appreciated that it will be preferable that concurrently-serviced access operations be in connection with information that is distributed across multiple disk storage units, so that they can be serviced concurrently. Otherwise stated, it is generally desirable to store information in disk storage units in such a manner that one disk drive unit not be heavily loaded, or busy servicing accesses, and while others are lightly loaded or idle. To accomplish that, it may be necessary to move, for example, frequently-accessed files from one disk storage unit, which may be relatively busy to another disk storage unit, which may be relatively idle. A problem arises, however, in determining whether a particular disk storage unit is relatively busy or idle. In addition, a problem arises in determining the likely performance increase that may be expected if a particular file is moved from one disk storage unit to another, which may be useful in determining whether a file should be moved from the relatively busy disk storage unit to the relatively idle disk storage unit. It will be appreciated that, if a file is moved from the relatively busy disk storage unit to the relatively idle disk storage unit, it may be desirable or necessary to also move one or more files from the relatively idle disk storage unit to the relatively busy disk storage unit, because of storage space limitations, so that the disk storage unit to which the file is moved does not itself become overloaded because of the move, or for other reasons that will be apparent to those skilled in the art. In any case, if the performance increase is predicted to be relatively small, a system administrator, for example, may determine that the file or files should not be moved. On the other hand, if the performance increase is predicted to be sufficiently large, the system administrator may deem it appropriate to move the file or files.

SUMMARY OF THE INVENTION

The invention provides a new and improved systems and methods of determining transfer of data among, for example, disk storage units comprising a mass storage subsystem or server to speed up access to data stored therein. In addition, the invention provides a new and improved system and method for predicting and evaluating the likely increase in performance that might result if data is moved from one disk storage device to another.

In brief summary, the invention provides, in one aspect, a busy disk evaluation system comprising a busy disk evaluation module and a control module. The busy disk evaluation module is configured to perform a busy disk evaluation operation in which it processes access request statistics relating to access requests directed to a server, the server including a plurality of disk storage units, respective access requests requesting access to respective ones of the disk storage units, to identify which, if any of the disk storage units is busy. The busy disk evaluation module is configured to determine whether a disk storage unit is busy in relation to a ratio between the number of access requests requesting access to the disk storage unit per unit time exceeds a selected access request per unit time threshold in relation to a total number of access requests and a selected ratio threshold. The control module is configured to control the busy disk evaluation module. In that operation, the control module is configured to provide the busy disk evaluation module with the selected ratio threshold.

In another aspect, the invention provides a busy disk evaluation module comprising an access request statistics processor module, a ratio determination module and a comparator. The access request statistics processor module is configured to process access request statistics relating to access requests directed to a server, the server including a plurality of disk storage units, respective access requests requesting access to respective ones of the disk storage units, to identify, for each disk storage unit, i. an access request high rate value corresponding to the number of access requests requesting access to the disk storage unit per unit time; and ii. an access request total value corresponding to the total number of access requests.

The ratio determination module is configured to determine, for each disk storage unit, a ratio value corresponding to the ratio between the access request high rate value and the access request total value for the respective disk storage unit. The comparator is configured to determine, for each disk storage unit, whether the ratio value determined by the ratio determination module is in selected relation to a selected ratio threshold and, if so, determine that the respective disk storage unit is busy.

BRIEF DESCRIPTION OF THE DRAWINGS

This invention is pointed out with particularity in the appended claims. The above and further advantages of this invention may be better understood by referring to the following description taken in conjunction with the accompanying drawings, in which:

DETAILED DESCRIPTION OF AN ILLUSTRATIVE EMBODIMENT

Figure 1:
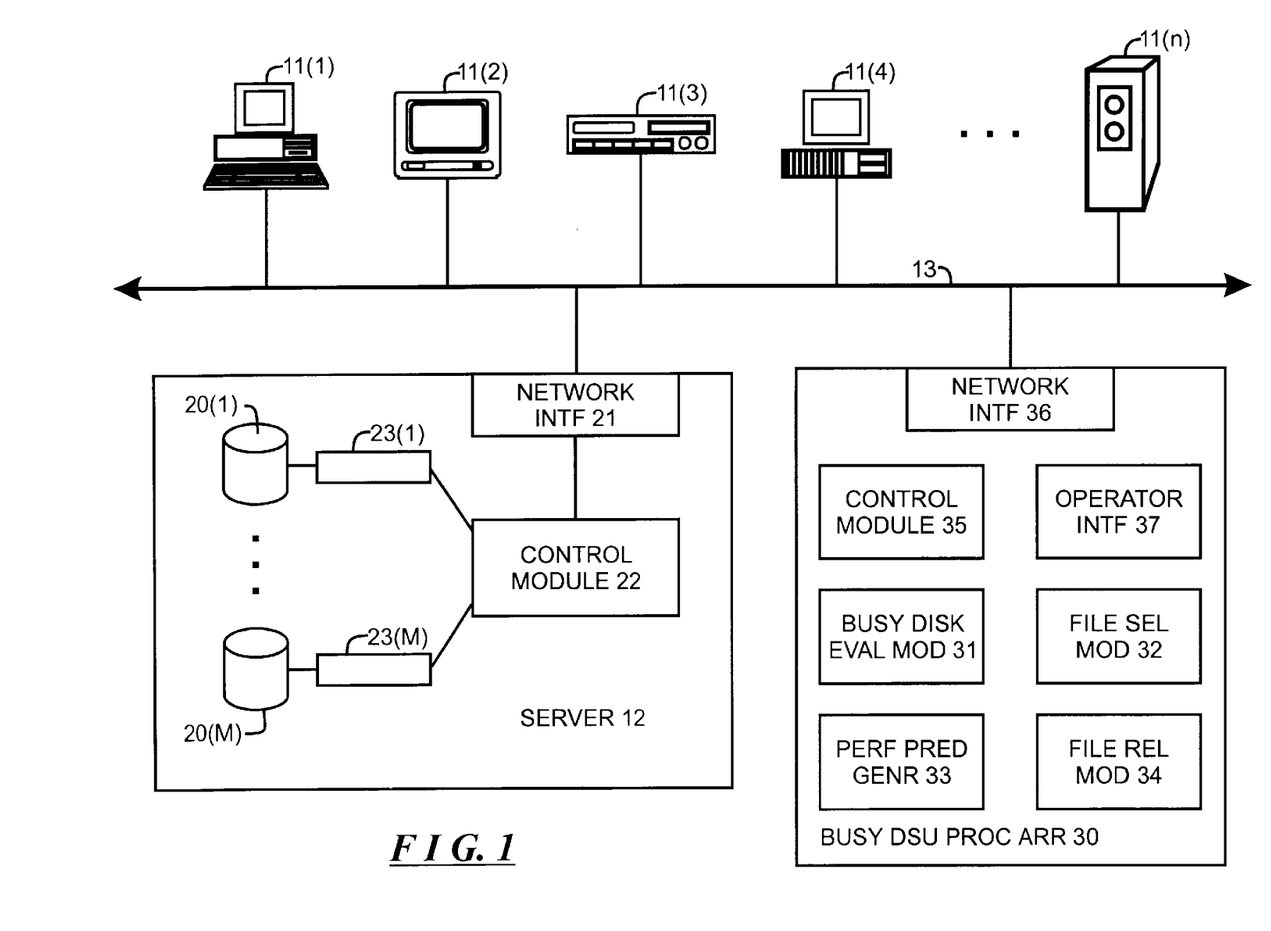
FIG. 1 schematically depicts an enterprise data processing system constructed in accordance with the invention.

FIG. 1 schematically depicts an enterprise data processing system 10 constructed in accordance with the invention.

With reference to FIG. 1, system 10 includes a plurality of information utilization devices 11(1) through 11(N) (generally identified by reference numeral 11(n)) which can access at least one server 12 over a communication link 13. The information utilization devices 11(n) used in system 10 may be any kind of devices that can retrieve and make use of digital information, including, for example, personal computers, workstations, mini- and mainframe computers. Alternatively or in addition, system 10 may include a number of other types of information utilization devices 11(n), such as devices that utilize, process or display digital video and/or audio information, or any other type of device that can utilize information in digital form. Generally, the server 12 stores information that can be retrieved by the information utilization devices 11(n) for processing, display or other use. The information utilization devices 11(n), to retrieve information for processing, display or other utilization, can generate retrieval requests for transmission to the server over the communication link 13. In response to the retrieval requests, the server 12 normally will provide information to the information utilization devices 11(n) for utilization thereby. On the other hand, for information utilization devices 11(n), such as computers, data acquisition devices or other types of devices that can generate information for storage by the server 12, those devices 11(n) can generate storage requests, also for transfer to the server 12. The storage requests are typically accompanied by information to be stored by the server 12, and, following receipt of the storage requests, the server 12 can store the information. The stored information may later be retrieved from the server 12 for processing or other use.

The server 12 includes a plurality of disk storage units 20(1) through 20(M) (generally identified by reference numeral 20(m) and a network interface 21 all of which operate under control of a control module 22. The disk storage units 20(m) store information in units of, for example, files. Generally, a file contains a particular type of information, such as, for example, a program, a database, a word processing file, video information, image information, audio information, or other types of information as will be apparent to those skilled in the art. A file may be stored on one disk storage unit 20(m). Alternatively, various portions of a file may be on multiple disk storage units 20(m), 20(m'), . . . . The network interface 21 connects to the communication link 13 and receives access requests, including the retrieval requests and the storage requests, and provides them to the control module 22. The control module 22 receives the storage and retrieval requests and controls the storage of information on the disk storage units 20(m) and the retrieval of information from the disk storage units 20(m). In addition, for retrieval requests, after the information has been retrieved from the respective disk storage units 20(m), the control module 22 will generate responses, which normally include the requested information, for transmission by the network interface 21 over the communication link 13 to the respective information utilization devices 11(n) that issued the requested the retrieval request.

The server 12 may receive and process a number of access requests concurrently, with the control module 22 scheduling access operations by the various disk storage units 20(m). The control module 22 maintains, for each disk storage unit 20(m), an access request queue 23(m) in which it loads access request for the respective disk storage unit 20(m). When an access request is received to retrieve information from, or store information in, a disk storage unit 20(m), the control module 22 can load it in the access request queue 23(m) associated with the disk storage unit 20(m). Generally, when a disk storage unit 20(m) is finished processing one access request, the control module 22 will pop another access request off one end of the access request queue 23(m) for processing. Depending on the scheduling algorithm used by the control module 22, the control module 22 may load the access request at the other end of the access request queue 23(m), in which case access requests will be processed in the order in which they are received. Alternatively, the control module 22 may load the access request in the access request queue 23(m) so that access requests will be popped off the access request queue in an order that would minimize movement of the disk storage unit's read/write heads or cause them to move in a uniform motion across the disks.

It will be appreciated that files will preferably be stored on particular disk storage units 20(n) in such a manner so as to avoid the likelihood that some disk storage units 11(n) will be heavily loaded and others lightly loaded, that is, that some disk storage units 11(n) have a relatively large number of concurrent access requests therefor and others have relatively few concurrent access requests. If a relatively large number of concurrent access requests are directed to some disk storage units 11(n), and relatively few to others, it will be appreciated that the access request queue 23(m) can become relatively long, in which case the time required to service access requests directed to the heavily loaded disk storage units 11(n) can become relatively large. That can be particularly undesirable in connection with retrieval requests, since the information utilization devices 11(n) that issued the retrieval requests may be delayed in receiving the requested information, which, in turn, will delay their utilization of the information. If a disk storage unit 11(n) is storing, for example, one or more database files that are being accessed concurrently, long service times can result in delays in retrieving data for transfer to the respective information utilization devices 11(n) that require the data for processing, which, in turn, can result in delays in processing by those devices 11(n). Similarly, if a disk storage unit 20(m) is storing files that are utilized in on-line transaction processing (OLTP), long service times can result in undesirable delays in transferring current information to the respective information utilization device 11(n) and in updating the information stored in the respective files to reflect the transaction. As an example of the latter, if the information utilization device 11(n) is an automatic teller machine (an "ATM machine") maintained by a banking institution, long service times can result in undesirable delays in retrieving current balance information for transfer to the machine for display to a customer, as well as undesirable delays in posting a deposit or withdrawal to the customer's account.

To accommodate that, the system 10 also includes an busy disk storage unit processing arrangement 30 for determining which, if any of the disk storage units 20(m) are relatively "busy," for predicting the increase in performance if files or portions thereof are relocated from the disk storage units 20(m'), 20(m''), . . . that are identified as being relatively busy and stored on other disk storage units 20(m'''), 20(m'''') (m', m''≠m''', m''''). Using the prediction, a system administrator can determine whether the files or portions thereof should be relocated. The arrangement 30 includes a busy disk evaluator module 31, a file selection module 32, a performance prediction generator 33 and a file relocation module 34, all operating under control of a control module 35. The arrangement may also have a network interface 36 and an operator interface 37. The busy disk evaluator module 31, using statistics gathered over a selected time frame, determines which, if any of the disk storage units 20(*m*) are relatively busy. Generally, the busy disk evaluator module 31 determines that a disk storage unit 20(*m*) is determined to be relatively busy if delays in servicing access requests are likely to be unduly delayed too often. Operations performed by the busy disk evaluator module 31 will be described in more detail below.

If the busy disk evaluator module 31 identifies one or more of the disk storage units 20(*m*'), 20(*m*") as relatively busy, the file selection module 32 will select a file on a busy disk storage unit 20(*m*') that may be relocated therefrom, as well as a file on a non-busy disk storage unit 20(*m*'"). The file selection module 32 will use various criteria to select the file on the non-busy disk storage unit 20(*m*'"), the criteria being such as to, inter alia, provide that, if the selected file on the busy disk storage unit 20(*m*') is relocated therefrom and stored on the non-busy disk storage unit 20(*m*'"), and the selected file on the non-busy disk storage unit 20(*m*'") is relocated therefrom and stored on the busy disk storage unit 20(*m*'), the busy disk storage unit 20(*m*') will be less busy. It will be appreciated that it is likely that relocation of the file from the busy disk storage unit 20(*m*') to the non-busy disk storage unit 20(*m*'"), but preferably the criteria used by the file selection module 32 will be such as to provide that the non-busy disk storage unit 20(*m*'") does not itself become busy if the file is relocated from the busy disk storage unit 20(*m*') to the non-busy disk storage unit 20(*m*'"). Operations performed by the file selection module 32 will be described in more detail below.

After the file selection module 32 has selected files on the busy disk storage unit 20(*m*') and the non-busy disk storage unit 20(*m*'"), the performance prediction generator 33 generates a prediction as to the change in performance if the selected files are relocated between the busy and non-busy disk storage units 20(*m*') and 20(*m*'"). Generally, the performance prediction generator 33 predicts the change in performance by assuming that, if the selected files are relocated, the access requests that request access to the file relocated from the busy disk storage unit 20(*m*') to the non-busy disk storage unit 20(*m*'") will be directed to the non-busy disk storage unit 20(*m*'") instead of the busy disk storage unit 20(*m*'). Similarly, the performance prediction generator 33 assumes that, if the selected files are relocated, the access requests that request access to the file relocated from the non-busy disk storage unit 20(*m*'") to the busy disk storage unit 20(*m*') will be directed to the busy disk storage unit 20(*m*') instead of the non-busy disk storage unit 20(*m*'"). The performance prediction generator 33 can predict the delay, if any, in processing all of the access requests directed to the respective busy disk storage unit 20(*m*') and non-busy disk storage unit 20(*m*'"), including the access requests that request access to the relocated files and the access requests that request access to the files that were not relocated. Generally, if the file selected for relocation from the busy disk storage unit 20(*m*') to the non-busy disk storage unit 20(*m*'") is associated with a significantly higher rate of access requests than the file selected for relocation from the non-busy disk storage unit 20(*m*'") to the busy disk storage unit 20(*m*'), the performance prediction generator 33 will predict that the performance of the server 12, which reflecting the complement of the delay in processing of access requests for files on disk storage units 20(*m*) contained therein, will be increased. After the performance predication generator 33 generates the performance predication, it will provide the prediction to, for example, a system administrator. Operations performed by the performance prediction generator 33 will be described in more detail below.

After the performance prediction generator 33 provides the performance prediction to the system administrator, he or she can determine whether the selected files are to be relocated between the respective busy and non-busy disk storage units 20(*m*') and 20(*m*'"). If the system administrator determines that the selected files are to be relocated, the file relocation module 34 can enable the server 12 to perform the relocation.

As noted above, the busy disk storage unit processing arrangement 30 also includes a network interface 36 and an operator interface 37. The network interface 36 allows the busy disk storage unit processing arrangement 30 to transmit and receive information over the communication link 13. As will be described below in greater detail, the busy disk evaluator module 31 and performance prediction generator 33 make use of access request statistics accumulated by the server 12, and the server 12 may provide the accumulated access request statistics to the busy disk storage unit processing arrangement 30 over the communication link 13. It will be appreciated that the accumulated access request information may be provided to the busy disk storage unit processing arrangement 30 by other mechanisms, including, for example, storing the accumulated access request statistics on a computer-readable medium and providing a media reader that can read the medium; it will be appreciated that, if the accumulated access request statistics are provided on a computer-readable medium, the busy disk storage unit processing arrangement 30 need not be provided with a network interface 36.

The operator interface 37 allows the arrangement 30 to display information to, for example, the system administrator, and the system administrator to input information to and otherwise control the arrangement 30. The operator interface 37 may include, for example, a video display for displaying information, including, for example, a list of busy disk storage units 20(*m*'), 20(*m*"), . . . . , the performance prediction, and the like. In addition, the operator interface 37 may include operator input devices, such as a keyboard, mouse, and the like, which the system administrator can use to provide information and control the arrangement 30. For example, as noted above, the busy disk evaluator module 31 and performance prediction generator 33 make use of accumulated access request statistics, with the statistics having been accumulated over one or more time periods. The system administrator may use the operator input devices to identify the time period or periods over which the statistics are to be accumulated. After the that case time period(s) have been identified, information therefor may be transferred to the server 12, which, in turn, can use information to control accumulation of the statistics. It will be appreciated that information as to the time period(s) over which the access request statistics are to be accumulated may be provided to the server in a number of ways, including, for example, through a console (not shown) on the server 12, through an information utilization device 11(*n*), and/or other ways, which will be appreciated to those skilled in the art.

As noted above, the busy disk storage unit processing arrangement 30 makes use of access request statistics accumulated over one or more time periods. The type of access request statistics that are gathered will depend on the type of applications for which the access requests were generated. For example, in one embodiment, for on-line transaction processing applications, the statistics will be service times for both retrieval operations and storage operations, that is, the amount of time, following receipt of a retrieval or storage request by the server 12, for the retrieval or storage operation to be completed. This is because times to complete both retrieval operations and storage operations can affect the transaction completion time. As noted above, service times for retrieval operations can affect providing information to the information utilization device $11(n)$ that may, for example, be displayed to a user for use in a transaction, and service times for storage operation can affect the time required to complete a transaction, and so statistics involving service times for both storage requests and retrieval requests are useful in determining whether or not a disk storage unit $20(m)$ is busy.

For DSS applications, in one embodiment, the statistics will be service times for retrieval operations, but not storage operations. Generally, when information is retrieved for processing by such applications, it is retrieved in relatively small blocks, processed and processed data may be transferred to the server 12 for storage. For such applications, the retrieval request service time can affect the processing times therefor. However, the service times required for storage requests is less important in DSS applications, since in DSS applications the ratio of storage operations to retrieval operations is typically fairly small, and DSS applications can continue operating after issuing a storage request without waiting for it to be completed.

For data warehousing applications, in which large amounts of information is retrieved from, for example, database files, for processing, the statistics will generally be service times for retrieval requests in relation to the amount of information retrieved. Generally, when information is retrieved for processing by such applications, it is retrieved in relatively large, variably sized blocks, processed and processed data may be transferred to the server 12 for storage. For such applications, the retrieval request service time can affect the processing times therefor. However, the service times required for storage requests is less important in data warehousing applications, since in data warehousing applications the ratio of the number of storage operations to the number of retrieval operations is typically fairly small, and data warehousing applications can continue operating after issuing a storage request without waiting for it to be completed.

Types of statistics for other types of applications will be apparent to those skilled in the art.

In gathering the statistics, the server 12 provides information for each retrieval and/or storage request, including, for example, the type of access request, that is, whether the access request is a retrieval request or a storage request, and the identification of the disk storage unit $20(m)$ involved in the storage request, that is, on which the information to be retrieved is stored in case of a retrieval request, or on which the information is to be stored in the case of a storage request. In addition, the server 12 will provide information as to the time period between the time at which the access request is received and the time at which service of the access request is completed. In determining the time period in the case of a retrieval request, the server 20 can determine the time at which the access request is completed as the time at which the information has been retrieved from the respective disk storage unit or units $20(m)$ or the time at which the information has been transferred to the information utilization device $11(n)$ that issued the retrieval request. It will be appreciated that, if the server 12 determines the time at which the access request is completed as the time at which the information has been transferred to the information utilization device $11(n)$ that tissued the retrieval request, that time period may include time that the information remains in an internal buffer (not shown) waiting transmission over the communication link 13. In addition, for retrieval requests, the server 12 will provide information as to the amount of information to be retrieved, which the busy disk evaluator module 31 can use in connection with retrieval requests from data warehousing applications.

In addition to the type of access request, the identification of the disk storage unit $20(m)$ involved in the access request and the time period between receipt of the request and the time it has been serviced, the server 12 can also provide other information for each access request, including, for example, the date and time at which the access request was received, and the length of the access request queue $23(m)$ when the respective access request is received.

The server 12 collects the statistics over a period of time specified by the busy disk evaluator module 31. The time period may comprise one continuous time period over a period of, for example, hours or days. Alternatively, the time period may be discontinuous, comprising, for example, a selected hour or hours a day on each of several specified days, or any other time period specified by the busy disk evaluator module 31. The busy disk evaluator module 31 may find it desirable to select a discontinuous time period if, for example, certain types of applications, such as data warehousing applications or DSS applications are primarily run certain times of day, if on-line transaction processing activity is seen to peak at certain times of day, or for other reasons that will be apparent to those skilled in the art. It will be appreciated that collecting statistics for times of day at which activity is seen to increase for certain types of applications can allow the busy disk evaluator module 31 to identify busy disk storage units using statistics generated when the disks are most likely to be busy in connection with particular types of applications.

Figure 2:
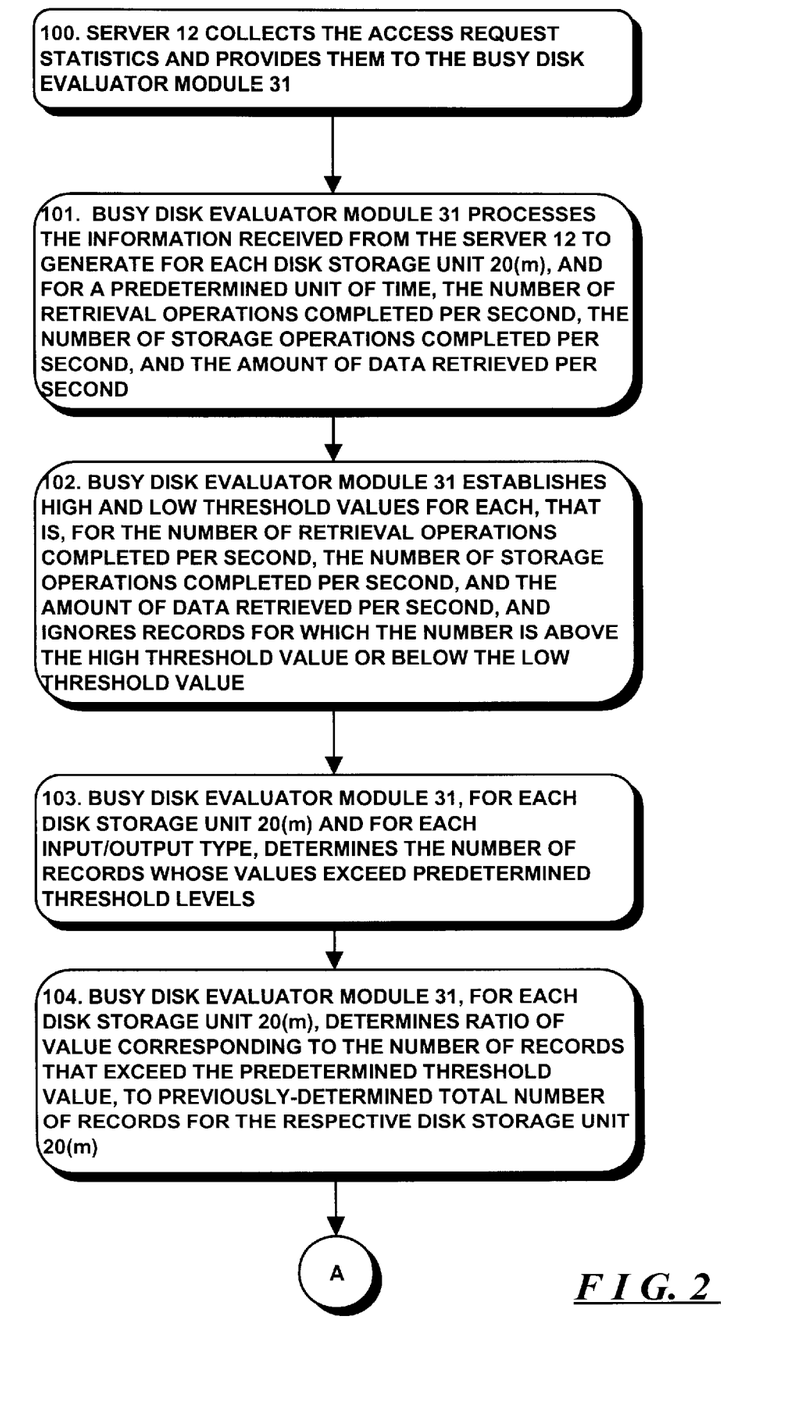
FIGS. 2 (2, 2A, 2B, 2C, and 2D) is a flow chart depicting operations performed by a busy disk storage unit processing arrangement that identifies busy disk storage units in a server provided in the data processing system, and that predicts changes in performance which may result if files are moved from busy disk storage units to non-busy disk storage units.

Operations performed by the busy disk evaluator module 31 will be described in connection with the flow chart depicted in FIG. 2. With reference to FIG. 2, after the server 12 has collected the statistics and provided them to the busy disk evaluator module 31 (step 100), the busy disk evaluator module 31 can process them to determine whether any of the disk storage units $20(m)$ are busy. In that operation, the busy disk evaluator module 31 initially processes the information received from the server 12 to generate for each disk storage unit $20(m)$, and for a predetermined unit of time, the number of retrieval operations completed per second, the number of storage operations completed per second, and the amount of data retrieved per second (step 101). The busy disk evaluator module 31 then establishes high and low threshold values for each, that is, for the number of retrieval operations completed per second, the number of storage operations completed per second, and the amount of data retrieved per second, and ignores records for which the number is above the high threshold value or below the low threshold value (step 102). Records for which the number is above the high threshold value may represent short-term and temporary spikes and records for which the number is below the low threshold value may represent temporary lulls, and considering those records in determining if a disk storage unit is a busy disk storage unit may improperly influence the determination.

For the records for which the values are between the high and low threshold values, the busy disk evaluator module 31 then counts the number of records associated with each disk storage unit $20(m)$. In addition, the busy disk evaluator module 31, for each disk storage unit $20(m)$ and for each input/output type, determines the number of records whose values exceed predetermined threshold levels (step 103). That is, the busy disk evaluator module 31 will determine, for records relating to the number of retrieval operations per second, the number of records for which the number of retrieval operations per second exceeds a predetermined threshold level. Similarly, for records relating to the number of storage operations per second, the busy disk evaluator module 31 will determine the number of records for which the number of storage operations per second exceeds a predetermined threshold. Furthermore, for records relating to the amount of data retrieved per second, the busy disk evaluator module 31 will determine the number of records for which the amount of data retrieved per second exceeds a predetermined threshold. In each case, the predetermined threshold is preferably a selected percentage of the respective maximum for the respective disk storage unit 20(m), that is, a percentage of the maximum number of retrieval operations or storage operations per second for the disk storage unit 20(m), or the maximum amount of data that can be retrieved from the disk storage unit per second.

Figure 2A:
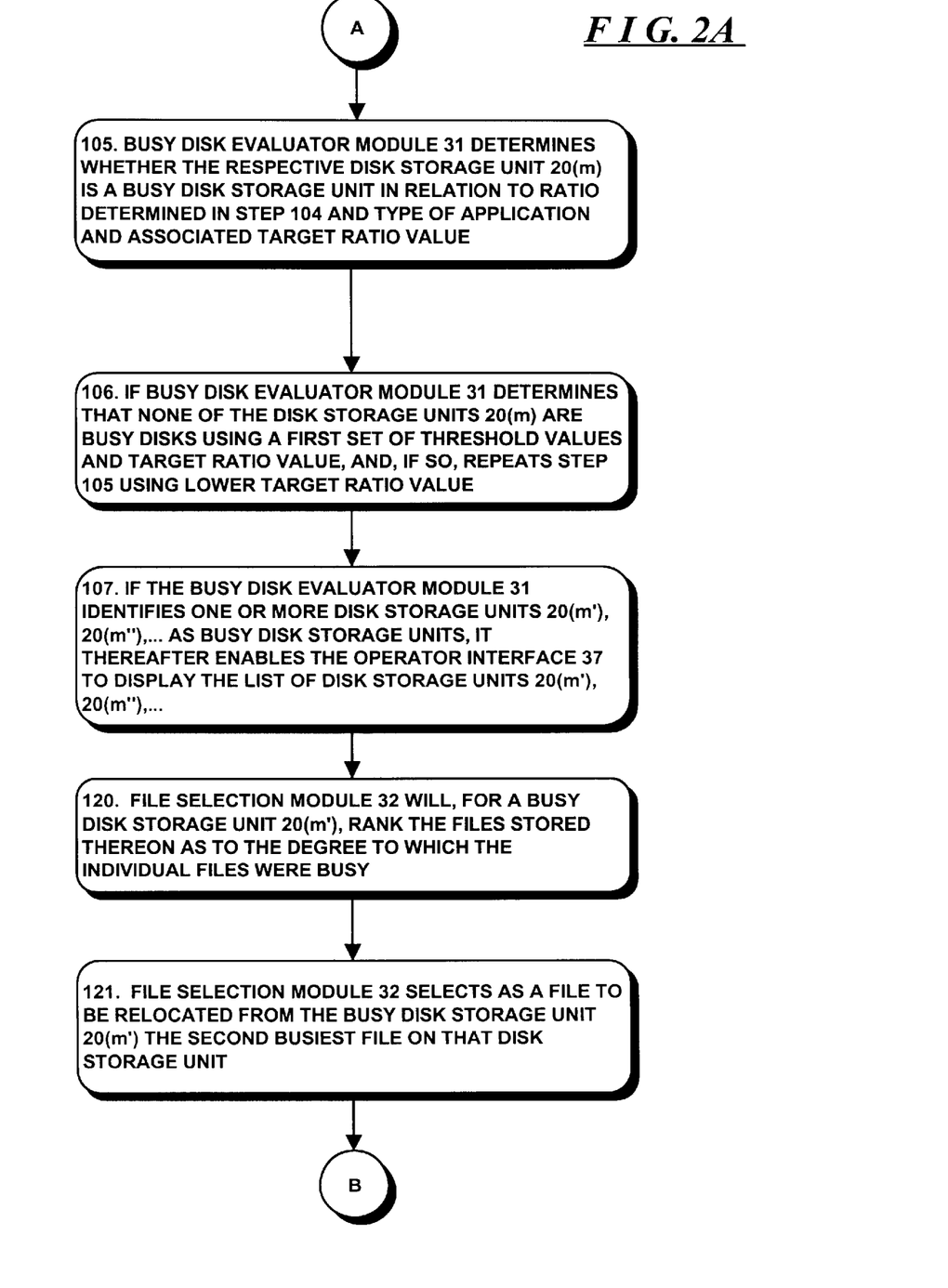

After the busy disk evaluator module 31 has determined, for each disk storage unit 20(m), values corresponding to the number of records that exceed the predetermined threshold value, it will use those values, along with the previously-determined total number of records for the respective disk storage unit 20(m), to determine a ratio (step 104) that, in turn, is used to determine whether the respective disk storage unit 20(m) is a busy disk storage unit (step 105). For example, for DSS applications, since, as described above, the number of retrieval operations per unit time is a useful metric for determining whether a disk storage unit 20(m) is busy, the busy disk evaluator module 31 can determine, for each disk storage unit 20(m), the ratio of the number of records that exceed the predetermined threshold to the total number of records. On the other hand, since, for on-line transaction processing applications, the sum of the number of retrieval operations and the number of storage operations per unit time is the useful metric for determining whether a disk storage unit 20(m) is busy, the busy disk evaluator module 31 can determine, for each disk storage unit 20(m), a value corresponding to number of records for retrieval operations that exceed the predetermined threshold and the number of records for storage operations, and determine the ratio of that value to the total number of records. In addition, since, as noted above, for data warehousing operations, the amount of data retrieved per unit time is a useful metric for determining whether a disk storage unit 20(m) is busy, the busy disk evaluator module 31 can determine, for each disk storage unit 20(m) the ratio of the number of records that exceed the predetermined threshold to the total number of records. In each case, if the ratio exceeds a target ratio value, the disk storage unit 20(m) will be determined to be a busy disk storage unit, and the extent to which the ratio exceeds the target ratio value will determine the degree to which it is a busy disk storage unit.

If the busy disk evaluator module 31 determines that none of the disk storage units 20(m) are busy disks using a first set of threshold values and target ratio value, it can repeat the operation using a second set of threshold values and target ratio value, preferably lower than the first set (step 106). These operations can be repeated a number of times to attempt to identify disk storage units 20(m) that are "busy disk storage units." In one embodiment, if the busy disk evaluator module 31 does not identify any disk storage units 20(m) as busy disk storage units during the first operation, it will repeat the operation once using lower threshold and target ratio value than were used during the first operation.

If the busy disk evaluator module 31 identifies one or more disk storage units 20(m'), 20(m''), . . . . as busy disk storage units, it thereafter enables the operator interface 37 to display the list of disk storage units 20(m'), 20(m''), . . . . that have been identified as busy disk storage units to, for example, a system administrator (step 107). In one embodiment, the busy disk storage unit(s) 20(m'), 20(m''), . . . . are displayed in descending order of the extent to which they are busy, that is, the extent to which the respective ratio exceeds the target ratio value.

Thereafter, the system administrator, or the file selection module 32 can select a file to be moved from one disk storage unit, preferably a busy disk storage unit 20(m'), 20(m''), . . . to another disk storage unit 20(m'''), 20(m'''') (m''', m''''≠m', m'') and enable the performance prediction generator 33 to predict the change of performance, if any, by moving the file. Generally, in moving a file from one disk storage unit 20(m) to another disk storage unit 20(m'), a file from disk storage unit 20(m') will also be expected to be moved from the disk storage unit 20(m') to the disk storage unit 20(m), and the file relocation module 33.

Figure 2B:
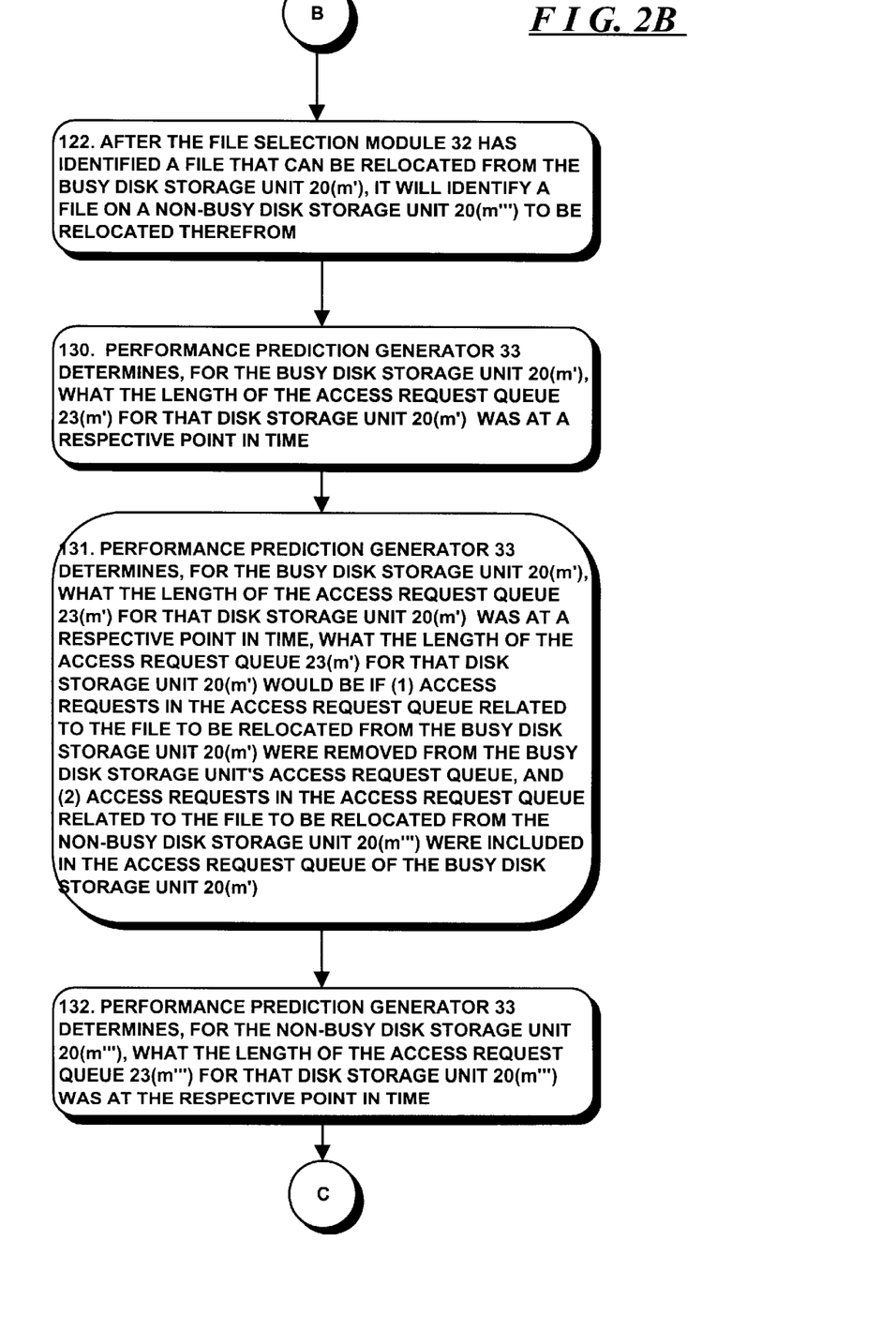

As noted above, after the busy disk evaluator module 31 has identified one or more disk storage units 20(m'), 20(m'') . . . . as busy, the file selection module 32 identifies one or more files that may be relocated therefrom to other disk storage units 20(m'''), 20(m''''), . . . . as well as one or more files that may be relocated from the other disk storage units 20(m'''), 20(m'''') to the busy disk storage units 20(m'), 20(m'') in exchange. Preferably, for each file to be relocated from a busy disk storage unit 20(m'), a file will be relocated from the disk storage unit 20(m') to which the file from the busy disk storage unit 20(m') has been relocated. In one embodiment, the file selection module 32 will, for a busy disk storage unit 20(m'), rank the files stored thereon as to the degree to which the individual files were busy (step 120), using criteria similar to those used by the busy disk evaluator module 31 in identifying busy disk storage units, and selects as a file to be relocated the second busiest file (step 121). The second busiest file is selected since relocating the busiest file may result in the busy disk storage unit 20(m') thereafter not being busy, but the disk storage unit 20(m''') to which the file is relocated may become busy because of the relocation. Unless there is a substantial difference between the utilization of the busiest file and the second busiest file, relocation of the second busiest file from the busy disk storage unit 20(m') should improve performance, even if a relatively busy file is relocated from the disk storage unit 20(m') to the busy disk storage unit 20(m').

After the file selection module 32 has identified a file that can be relocated from the busy disk storage unit 20(m'), it will identify a file on a non-busy disk storage unit 20(m''') to be relocated therefrom (step 122). Generally, the file relocation module 33 makes use of a number of criteria in identifying a file to relocate from the non-busy disk storage unit 20(m'''), including:

(i) file size: preferably, the selected file on the non-busy disk storage unit 20(m''') will be approximately the same size as the file to be relocated from the busy disk storage unit 20(m'); in one embodiment, the file relocation module 33 selects a file that is at most thirty percent larger than the file to be relocated from the busy disk storage unit 20(m');

(ii) input/output capability: preferably, the selected file on the non-busy disk storage unit 20(m''') will be equal to or greater than the input/output capability of the file to be relocated from the busy disk storage unit 20(m');

(iii) actual input/output limitation over a predetermined period of time, such as a work shift: preferably, the selected file on the non-busy disk storage unit 20(m''') will be accessed less than a predetermined percentage of the number of times the file to be relocated from the busy disk storage unit 20($m'$) during the predetermined period of time;

(iv) file tablespace: preferably, the selected file on the non-busy disk storage unit 20($m'''$) will have the same table space as the file to be relocated from the busy disk storage unit 20($m'$), but it (that is, the selected file on the non-busy disk storage unit 20($m'''$) will not be in the same table space as any of the files that are not to be relocated from the busy disk storage unit 20($m'$);

(v) file table/index: preferably the selected file on the non-busy disk storage unit 20($m'''$) will not contain objects that relate to the files that are not to be relocated from the busy disk storage unit 20($m'$), and, similarly, the non-busy disk storage unit 20($m'''$) will not contain files (other than, possibly, the selected file) that contain objects that relate to objects in the file to be relocated from the busy disk storage unit 20($m'$);

(vi) balancing minimization: preferably, the selected file on the non-busy disk storage unit 20($m'''$) will be a relatively non-busy file from a relatively non-busy disk storage unit 20($m'''$).

It will be appreciated that, the file selection module 33 will also preferably avoid selecting a file that is associated with a file on a busy disk. In addition, if the file selection module 33 determines that a prospective non-busy disk storage unit 20($m'''$) is a logical disk storage unit on a physical disk storage unit that also includes the busy disk storage unit 20($m'$), the file selection module 33 will preferably avoid selecting a file from that non-busy disk storage unit 20($m'''$), since no change will be made to the rate at which access requests are directed to the physical disk storage unit. In addition, if, in the server 12, information is stored in a mirror arrangement, the file selection module 33 will preferably avoid selecting a file from a prospective non-busy disk storage unit 20($m'''$) that has a related by volume file on the mirror of the busy disk storage unit 20($m'$).

These criteria will ensure, inter alia, that (a) the file to be relocated from the non-busy disk storage unit 20($m'''$) to the busy disk storage unit 20($m'$) will be subject of a relatively low rate of access requests in comparison to other files in the server 12 (reference criterion (vi));

(b) the file to be relocated from the non-busy disk storage unit 20($m'''$) to the busy disk storage unit 20($m'$) will not require substantially more storage space or table space than the file that is being relocated from the busy disk storage unit 20($m'$) (reference criterion (i)); and (c) that, if the file is relocated from the non-busy disk storage unit 20($m'''$) to the busy disk storage unit 20($m'$), the relocation would not increase the likelihood that access requests from applications would be concentrated on the busy disk storage unit 20($m'$), which may occur if the file to be relocated contains objects that related to objects in the files on the busy disk storage unit 20($m'$) (reference criterion (v)).

After the file selection module 32 has selected a file on a non-busy disk storage unit 20($m'''$) to be relocated to the busy disk storage unit 20($m'$), the performance prediction generator 33 can generate a prediction as to the change in performance, if any that might result from the relocation. Generally, the performance prediction can be determined by, for example, (i) assuming that all of the access requests requesting accesses to the file to be relocated from the busy disk storage unit 20($m'$) to the non-busy disk storage unit 20($m'''$) will be directed to the non-busy disk storage unit 20($m'''$) instead of the busy disk storage unit 20($m'$), and (ii) that the access requests requesting accesses to the file to be relocated from the non-busy disk storage unit 20($m'''$) to the busy disk storage unit 20($m'$) will be directed to the non-busy disk storage unit 20($m'''$).

The performance prediction generator 33 can process the earlier-acquired access request statistics to determine, for example, the likely changes in the length of the access request queue 23($m'$) for the busy disk storage unit 20($m'$) at various points in time because (i) access requests for the busy disk storage unit 20($m'$) for the file located therefrom would have been directed to the non-busy disk storage unit 20($m'''$), effectively reducing the number of access requests directed to the busy disk storage unit 20($m'$) by that number of access requests, but (ii) access requests for the file relocated thereto from the non-busy disk storage unit 20($m'''$) would have been directed to the busy disk storage unit 20($m'$), effectively increasing the number of access requests directed to the busy disk storage unit 20($m'$) by that number of access requests.

Generally, the server's performance in connection with processing of an access request can be viewed as a function of the delay, after it receives the access request, before it processes the request, that is, in the case of a storage request, before it stores information on the respective disk storage unit 20($m$), or, in the case of a retrieval request, before it retrieves the data from the respective disk storage unit 20($m$) for transfer to the requesting information utilization device 11($n$). The performance prediction generator 33 can generate a prediction of the performance improvement of the server 12 by processing the queue length statistics for both the busy disk storage unit 20($m'$) and the non-busy disk storage unit 20($m'''$), at, for example, particular points in time to determine the increase in performance (or reduction in service time) for the busy disk storage unit 20($m'$) and decrease in performance (or increase in service time) for the non-busy disk storage unit 20($m'''$), which might have occurred if the files had been relocated between the respective disk storage units 20($m'$) and 20($m'''$). In that determination, the performance prediction generator 33 can essentially simulate what would occur by determining what the changes in lengths of the respective access queues 23($m'$) and 23($m'''$) would have been for both the busy and non-busy disk storage units 20($m$) and 20($m'$) if the files had been relocated therebetween.

Figure 2C:
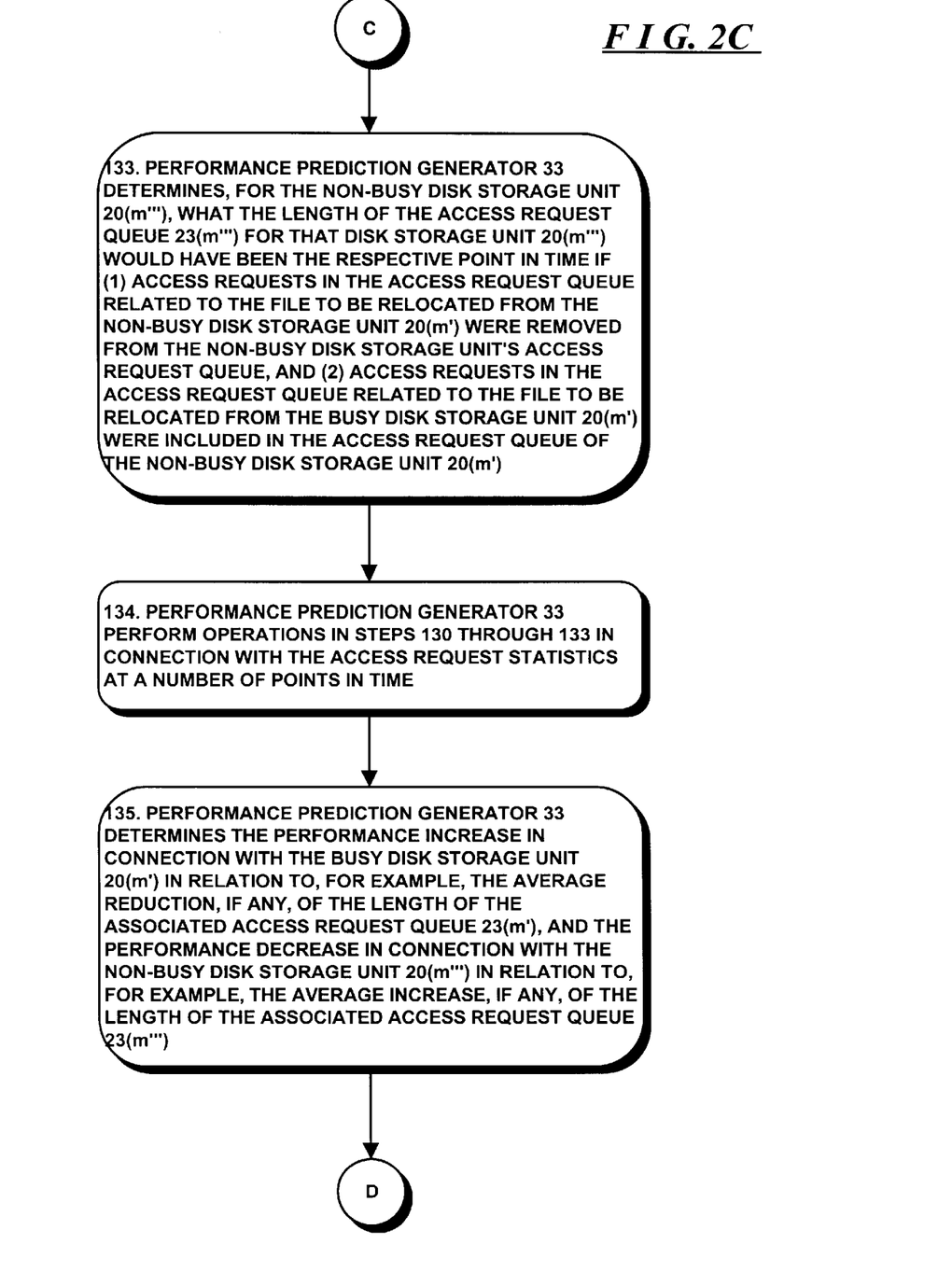

Accordingly, for each of the respective points in time, the performance prediction generator 33 can determine, (i) for the busy disk storage unit 20($m'$), (a) what the length of the access request queue 23($m'$) for that disk storage unit 20($m'$) was at the respective point in time (step 130), and (b) what the length of the access request queue 23($m'$) for that disk storage unit 20($m'$) would be if (1) access requests in the access request queue related to the file to be relocated from the busy disk storage unit 20($m'$) were removed from the busy disk storage unit's access request queue, and (2) access requests in the access request queue related to the file to be relocated from the non-busy disk storage unit 20($m'''$) were included in the access request queue of the busy disk storage unit 20($m'$) (step 131), and (ii) for the non-busy disk storage unit 20($m'''$),
    (a) what the length of the access request queue 23($m'''$) for that disk storage unit 20($m'''$) was at the respective point in time (step 132), and
    (b) what the length of the access request queue 23($m'''$) for that disk storage unit 20($m'''$) would have been the respective point in time if
        (1) access requests in the access request queue related to the file to be relocated from the non-busy disk storage unit 20($m'$) were removed from the non-busy disk storage unit's access request queue, and
        (2) access requests in the access request queue related to the file to be relocated from the busy disk storage unit 20($m'$) were included in the access request queue of the non-busy disk storage unit 20($m'$) (step 133).

In determining what the length of the access request queue 23($m'$) for the busy disk storage unit 20($m'$) would likely be if the files are relocated between the busy and non-busy disk storage unit 20($m'$) and 20($m'''$) (items (i)(b) and (ii)(b) above), the performance prediction generator can
    (1) determine the number of access requests in the access request queue 23($m'$) that are not related to the file to be relocated from the busy disk storage unit 20($m'$) (which corresponds to the total number of access requests in the access request queue 23($m'$), minus the number of access requests in the access request queue 23($m'$) that are related to the file to be relocated from the busy disk storage unit 20($m'$), plus
    (2) determine the time period represented by the access requests in the access request queue 23($m'$) that are not related to the file to be relocated from the busy disk storage unit 20($m'$), and
    (3) determine the number of access requests that would likely be in the access request queue 23($m'$) of the busy disk storage unit 20($m'$) as the number determined in (1) immediately above, plus the number of access requests that were received by the server 12 for the file selected to be relocated from the non-busy disk storage unit 20($m'''$) to the busy disk storage unit 20($m'$) during the time period determined in (2) immediately above.

The performance prediction generator 33 can perform similar operations in connection with determining the likely length of the access request queue 23($m'''$) for the non-busy disk storage unit 23($m'''$).

The performance prediction generator 33 can perform these operations in connection with the access request statistics at a number of points in time (step 134) to determine the likely decrease (in the case of the busy disk storage unit 20($m'$)) and increase (in the case of the non-busy disk storage unit 20($m'''$)) in the lengths of the respective access request queues 23($m'$) and 23($m'''$) at those points in time. The performance prediction generator 33 can determine the performance increase in connection with the busy disk storage unit 20($m'$) in relation to, for example, the average reduction, if any, of the length of the associated access request queue 23($m'$), and the performance decrease in connection with the non-busy disk storage unit 20($m'''$) in relation to, for example, the average increase, if any, of the length of the associated access request queue 23($m'''$) (step 135).

Figure 2D:
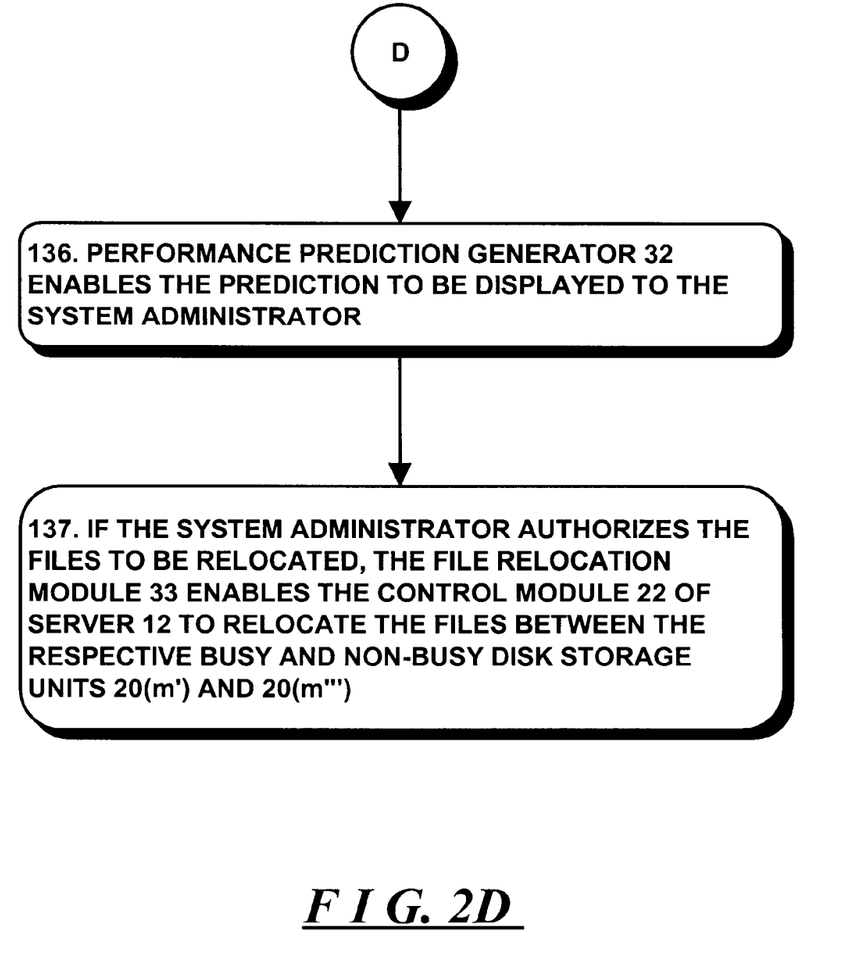

After the performance prediction generator 33 has generated the prediction, it can enable the prediction to be displayed to the system administrator (step 136). Thereafter, the system administrator can decide whether to authorize the relocation of the respective files between the busy and non-busy disk storage units 20($m$) and 20($m'$). If the system administrator authorizes the files to be relocated, the file relocation module 33 can enable the control module 22 to relocate the files between the respective busy and non-busy disk storage units 20($m'$) and 20($m'''$) (step 137).

The invention provides a number of advantages. In particular, the invention provides an arrangement for determining whether one or more disk storage units 20($m$) in a server 12 is relatively busy. In addition, the invention provides an arrangement for predicting the likely increase in performance of the server if a file is relocated from a busy disk storage unit to a non-busy disk storage unit.

It will be appreciated that a number of modifications may be made to the busy disk storage unit processing arrangement 30 as described above. For example, the busy disk evaluator module 31 may make use of a number of values as the threshold values for determining whether a disk storage unit is busy. Furthermore, the file selection module 32 can make use of fewer or additional criteria in selecting a file to be relocated from the non-busy disk storage unit 20($m'''$) to the busy disk storage unit 20($m'$). In addition, the performance prediction generator 33, instead of using changes in the lengths of the access queues 23($m'$) and 23($m'''$) for the respective busy and non-busy disk storage units 20($m'$) and 20($m'''$), may use other criteria, including, for example, rate at which access requests are received at particular points in time.

It will be appreciated that a system in accordance with the invention can be constructed in whole or in part from special purpose hardware or a general purpose computer system, or any combination thereof, any portion of which may be controlled by a suitable program. Any program may in whole or in part comprise part of or be stored on the system in a conventional manner, or it may in whole or in part be provided in to the system over a network or other mechanism for transferring information in a conventional manner. In addition, it will be appreciated that the system may be operated and/or otherwise controlled by means of information provided by an operator using operator input elements (not shown) which may be connected directly to the system or which may transfer the information to the system over a network or other mechanism for transferring information in a conventional manner.

The foregoing description has been limited to a specific embodiment of this invention. It will be apparent, however, that various variations and modifications may be made to the invention, with the attainment of some or all of the advantages of the invention. It is the object of the appended claims to cover these and such other variations and modifications as come within the true spirit and scope of the invention.

What is claimed as new and desired to be secured by Letters Patent of the United States is:

1. A busy disk evaluation system comprising:
    A. a busy disk evaluation module configured to perform a busy disk evaluation operation in which it processes access request statistics relating to access requests directed to a server, the server including a plurality of disk storage units, respective access requests requesting access to respective ones of said disk storage units, to identify which, if any of the disk storage units is busy, the busy disk evaluation module being configured to determine whether a disk storage unit is busy in relation to a ratio between the number of access requests requesting access to said disk storage unit per unit time that exceeds a selected access request per unit time threshold in relation to a total number of access requests and a selected ratio threshold; and B. a control module configured to control the busy disk evaluation module, the control module being configured to provide the busy disk evaluation module with the selected ratio threshold.

2. A busy disk evaluation system as defined in claim 1 in which the control module is configured to, if the busy disk evaluation module determines that no disk storage units are busy in relation to one selected ratio threshold, enable the busy disk evaluation module to perform a second busy disk evaluation operation in connection with a second selected ratio threshold.

3. A busy disk evaluation system as defined in claim 2 in which the second selected ratio threshold is lower than the selected ratio threshold.

4. A busy disk evaluation system as defined in claim 1 in which the busy disk evaluation module comprises:
   A. an access request statistics processor module configured to process the access request statistics to identify, for each disk storage unit,
      i. an access request high rate value corresponding to the number of access requests requesting access to said disk storage unit per unit time; and
      ii. an access request total value corresponding to the total number of access requests;
   B. a ratio determination module configured to determine, for each disk storage unit, a ratio value corresponding to the ratio between the access request high rate value and the access request total value for the respective disk storage unit; and
   B. a comparator configured to determine, for each disk storage unit, whether the ratio value determined by the ratio determination module is in selected relation to the selected ratio threshold and, if so, determine that the respective disk storage unit is busy.

5. A busy disk evaluation system as defined in claim 4 in which the access request statistics processor is further configure to, in generating the access request high rate value for at least one disk storage unit, exclude at least one of access requests per unit time that at least one of (i) exceeds a predetermined high rate threshold and (ii) is less than a predetermined low rate threshold.

6. A busy disk evaluation system as defined in claim 1 in which each access request is associated with one of a plurality of types of applications, the busy disk evaluation module being configured to determine the ratio in relation to the type of application.

7. A busy disk evaluation system as defined in claim 6 in which one type of application is an on-line transaction processing type, the busy disk evaluation module being configured to make use of access request statistics relating to both requests requesting retrieval of information from respective disk storage units and requests requesting storage of information on respective disk storage units.

8. A busy disk evaluation system as defined in claim 6 in which is one type of application is a DSS transaction type, the busy disk evaluation module being configured to make use of access request statistics relating to requests requesting retrieval of information from respective disk storage units.

9. A busy disk evaluation system as defined in claim 6 in which is one type of application is a data warehousing transaction type, the busy disk evaluation module being configured to make use of access request statistics relating to requests requesting retrieval of respective amounts of information from respective disk storage units.

10. A busy disk evaluation module comprising:
    A. an access request statistics processor module configured to process access request statistics relating to access requests directed to a server, the server including a plurality of disk storage units, respective access requests requesting access to respective ones of said disk storage units, to identify, for each disk storage unit,
       i. an access request high rate value corresponding to the number of access requests requesting access to said disk storage unit per unit time; and
       ii. an access request total value corresponding to the total number of access requests;
    B. a ratio determination module configured to determine, for each disk storage unit, a ratio value corresponding to the ratio between the access request high rate value and the access request total value for the respective disk storage unit; and
    C. a comparator configured to determine, for each disk storage unit, whether the ratio value determined by the ratio determination module is in selected relation to a selected ratio threshold and, if so, determine that the respective disk storage unit is busy.

11. A busy disk evaluation module as defined in claim 10 in which the access request statistics processor is further configure to, in generating the access request high rate value for at least one disk storage unit, exclude at least one of access requests per unit time that at least one of (i) exceeds a predetermined high rate threshold and (ii) is less than a predetermined low rate threshold.

12. A busy disk evaluation module as defined in claim 10 in which each access request is associated with one of a plurality of types of applications, the access request statistics processor module being configured to determine the access request high rate value in relation to the type of application.

13. A busy disk evaluation module as defined in claim 12 in which one type of application is an on-line transaction processing type, the access request statistics processor module being configured to determine the access request high rate value in relation to access request statistics relating to both access requests requesting retrieval of information from respective disk storage units and access requests requesting storage of information on respective disk storage units.

14. A busy disk evaluation module as defined in claim 12 in which is one type of application is a DSS transaction type, the access request statistics processor module being configured to determine the access request high rate value in relation to access request statistics relating to requests requesting retrieval of information from respective disk storage units.

15. A busy disk evaluation module as defined in claim 12 in which is one type of application is a data warehousing transaction type, the access request statistics processor module being configured to determine the access request high rate value in relation to access request statistics relating to access requests requesting retrieval of respective amounts of information from respective disk storage units.

16. A computer program product for use in connection with a computer to provide a busy disk evaluation system, the computer program product comprising a computer readable medium having encoded thereon:
    A. a busy disk evaluation module configured to enable said computer to perform a busy disk evaluation operation in which it processes access request statistics relating to access requests directed to a server, the server including a plurality of disk storage units, respective access requests requesting access to respective ones of said disk storage units, to identify which, if any of the disk storage units is busy, the busy disk evaluation module being configured to enable said computer to determine whether a disk storage unit is busy in relation to a ratio between the number of access requests requesting access to said disk storage unit per unit time that exceeds a selected access request per unit time threshold in relation to a total number of access requests and a selected ratio threshold; and B. a control module configured to enable said computer to control the busy disk evaluation module, the control module being configured to enable said computer to provide the busy disk evaluation module with the selected ratio threshold.

17. A computer program product as defined in claim 16 in which the control module is configured to enable said computer to, if the busy disk evaluation module determines that no disk storage units are busy in relation to one selected ratio threshold, enable the busy disk evaluation module to perform a second busy disk evaluation operation in connection with a second selected ratio threshold.

18. A computer program product as defined in claim 17 in which the second selected ratio threshold is lower than the selected ratio threshold.

19. A computer program product as defined in claim 16 in which the busy disk evaluation module comprises:

A. an access request statistics processor module configured to enable said computer to process the access request statistics to identify, for each disk storage unit,
   i. an access request high rate value corresponding to the number of access requests requesting access to said disk storage unit per unit time; and
   ii. an access request total value corresponding to the total number of access requests;

B. a ratio determination module configured to enable said computer to determine, for each disk storage unit, a ratio value corresponding to the ratio between the access request high rate value and the access request total value for the respective disk storage unit; and C. a comparator configured to enable said computer to determine, for each disk storage unit, whether the ratio value determined by the ratio determination module is in selected relation to the selected ratio threshold and, if so, determine that the respective disk storage unit is busy.

20. A computer program product as defined in claim 19 in which the access request statistics processor is further configure to, in generating the access request high rate value for at least one disk storage unit, exclude at least one of access requests per unit time that at least one of (i) exceeds a predetermined high rate threshold and (ii) is less than a predetermined low rate threshold.

21. A busy disk evaluation system as defined in claim 16 in which each access request is associated with one of a plurality of types of applications, the busy disk evaluation module being configured to enable said computer to determine the ratio in relation to the type of application.

22. A computer program product as defined in claim 21 in which one type of application is an on-line transaction processing type, the busy disk evaluation module being configured to enable said computer to make use of access request statistics relating to both requests requesting retrieval of information from respective disk storage units and requests requesting storage of information on respective disk storage units.

23. A computer program product as defined in claim 21 in which is one type of application is a DSS transaction type, the busy disk evaluation module being configured to enable said computer to make use of access request statistics relating to requests requesting retrieval of information from respective disk storage units.

24. A computer program product as defined in claim 21 in which is one type of application is a data warehousing transaction type, the busy disk evaluation module being configured to enable said computer to make use of access request statistics relating to requests requesting retrieval of respective amounts of information from respective disk storage units.

25. A computer program product for use in connection with a computer to provide a busy disk evaluation module, the computer program product comprising a computer-readable medium having encoded thereon:

A. an access request statistics processor module configured to enable said computer to process access request statistics relating to access requests directed to a server, the server including a plurality of disk storage units, respective access requests requesting access to respective ones of said disk storage units, to identify, for each disk storage unit,
   i. an access request high rate value corresponding to the number of access requests requesting access to said disk storage unit per unit time; and
   ii. an access request total value corresponding to the total number of access requests;

B. a ratio determination module configured to enable said computer to determine, for each disk storage unit, a ratio value corresponding to the ratio between the access request high rate value and the access request total value for the respective disk storage unit; and C. a comparator configured to enable said computer to determine, for each disk storage unit, whether the ratio value determined by the ratio determination module is in selected relation to a selected ratio threshold and, if so, determine that the respective disk storage unit is busy.

26. A computer program product as defined in claim 25 in which the access request statistics processor is further configure to, in generating the access request high rate value for at least one disk storage unit, exclude at least one of access requests per unit time that at least one of (i) exceeds a predetermined high rate threshold and (ii) is less than a predetermined low rate threshold.

27. A busy disk evaluation module as defined in claim 25 in which each access request is associated with one of a plurality of types of applications, the access request statistics processor module being configured to enable said computer to determine the access request high rate value in relation to the type of application.

28. A computer program product as defined in claim 27 in which one type of application is an on-line transaction processing type, the access request statistics processor module being configured to enable said computer to determine the access request high rate value in relation to access request statistics relating to both access requests requesting retrieval of information from respective disk storage units and access requests requesting storage of information on respective disk storage units.

29. A computer program product as defined in claim 27 in which is one type of application is a DSS transaction type, the access request statistics processor module being configured to enable said computer to determine the access request high rate value in relation to access request statistics relating to requests requesting retrieval of information from respective disk storage units.

30. A computer program product as defined in claim 27 in which is one type of application is a data warehousing transaction type, the access request statistics processor module being configured to enable said computer to determine the access request high rate value in relation to access request statistics relating to access requests requesting retrieval of respective amounts of information from respective disk storage units.

31. A busy disk evaluation method comprising:
  A. an access request statistics processing step in which access request statistics relating to access requests directed to a server, the server including a plurality of disk storage units, respective access requests requesting access to respective ones of said disk storage units, are processed to identify, for each disk storage unit,
    i. an access request high rate value corresponding to the number of access requests requesting access to said disk storage unit per unit time; and
    ii. an access request total value corresponding to the total number of access requests;
  B. a ratio determination step of determining, for each disk storage unit, a ratio value corresponding to the ratio between the access request high rate value and the access request total value for the respective disk storage unit; and
  C. a comparator step of determining, for each disk storage unit, whether the ratio value determined by the ratio determination step is in selected relation to a selected ratio threshold and, if so, determining that the respective disk storage unit is busy.

32. A busy disk evaluation method as defined in claim 31 in which the access request statistics processing step includes the step of, in generating the access request high rate value for at least one disk storage unit, excluding at least one of access requests per unit time that at least one of (i) exceeds a predetermined high rate threshold and (ii) is less than a predetermined low rate threshold.

33. A busy disk evaluation method as defined in claim 31 in which each access request is associated with one of a plurality of types of applications, the access request statistics processing step including the step of determining the access request high rate value in relation to the type of application.

34. A busy disk evaluation method as defined in claim 33 in which one type of application is an on-line transaction processing type, the access request statistics processing step including the step of determining the access request high rate value in relation to access request statistics relating to both access requests requesting retrieval of information from respective disk storage units and access requests requesting storage of information on respective disk storage units.

35. A busy disk evaluation method as defined in claim 33 in which is one type of application is a DSS transaction type, the access request statistics processing step including the step of determining the access request high rate value in relation to access request statistics relating to requests requesting retrieval of information from respective disk storage units.

36. A busy disk evaluation method as defined in claim 33 in which is one type of application is a data warehousing transaction type, the access request statistics processing step including the step of determining the access request high rate value in relation to access request statistics relating to access requests requesting retrieval of respective amounts of information from respective disk storage units.

* * * * *